(12) United States Patent
Dellorto

(10) Patent No.: US 12,139,916 B2
(45) Date of Patent: Nov. 12, 2024

(54) STAIRCASE HANDRAIL SUPPORT DEVICE

(71) Applicant: Silvino Dellorto, South Yarmouth, MA (US)

(72) Inventor: Silvino Dellorto, South Yarmouth, MA (US)

(*) Notice: Subject to any disclaimer, the term of this patent is extended or adjusted under 35 U.S.C. 154(b) by 475 days.

(21) Appl. No.: 17/502,516

(22) Filed: Oct. 15, 2021

(65) Prior Publication Data

US 2022/0120089 A1    Apr. 21, 2022

Related U.S. Application Data

(60) Provisional application No. 63/093,034, filed on Oct. 16, 2020.

(51) Int. Cl.
| | | |
|---|---|---|
| *E04F 21/26* | (2006.01) | |
| *E04F 11/18* | (2006.01) | |
| *G01B 3/56* | (2006.01) | |
| *G01B 5/24* | (2006.01) | |

(52) U.S. Cl.
CPC .......... *E04F 11/1802* (2013.01); *E04F 21/26* (2013.01); *G01B 3/56* (2013.01); *G01B 3/563* (2013.01); *G01B 5/24* (2013.01)

(58) Field of Classification Search
CPC ........ E04F 11/1802; E04F 21/26; G01B 3/56; G01B 3/563; G01B 5/24
USPC .............................. 33/424, 462, 461; 269/43
See application file for complete search history.

(56) References Cited

U.S. PATENT DOCUMENTS

| | | | | |
|---|---|---|---|---|
| 1,622,158 A | * | 3/1927 | Liberty | E04F 21/26 |
| | | | | 33/462 |
| 1,770,863 A | * | 7/1930 | Smith | E04F 21/26 |
| | | | | 33/462 |
| 1,809,401 A | * | 6/1931 | Cattell | E04F 21/26 |
| | | | | 248/200.1 |
| 1,831,693 A | * | 11/1931 | Trotter | B43L 7/10 |
| | | | | 33/420 |
| 3,991,474 A | * | 11/1976 | Rath | B43L 7/12 |
| | | | | 33/462 |
| 5,205,045 A | * | 4/1993 | Liu | B23Q 9/005 |
| | | | | 33/468 |
| 9,021,713 B1 | * | 5/2015 | Pierson | B43L 7/10 |
| | | | | 33/529 |

(Continued)

FOREIGN PATENT DOCUMENTS

| | | | | |
|---|---|---|---|---|
| CA | 1261139 A | * | 9/1989 | ............... E04F 21/26 |
| CA | 2138677 C | * | 7/2005 | ............... B25H 7/02 |
| EP | 2085536 A1 | * | 8/2009 | ............... E04F 21/26 |

*Primary Examiner* — Mahdi H Nejad
(74) *Attorney, Agent, or Firm* — The Iwashko Law Firm, PLLC; Lev Ivan Gabriel Iwashko

(57) ABSTRACT

A staircase handrail support device removably connected to a staircase to facilitate installation of a handrail, the staircase handrail support device including a telescopic pole, a base connected to at least a portion of a first end of the telescopic pole to stabilize the telescopic pole on the staircase, a first miter gauge pivotally disposed on at least a portion of the first end of the telescopic pole to indicate a first angle of the telescopic pole with respect to the base, and a second miter gauge pivotally disposed on at least a portion of a second end of the telescopic pole to receive the handrail thereon and indicate a second angle of the telescopic pole with respect to the second miter gauge.

5 Claims, 3 Drawing Sheets

(56) References Cited

U.S. PATENT DOCUMENTS

| | | | |
|---|---|---|---|
| 2004/0181955 A1* | 9/2004 | Sargent | B43L 7/10 33/473 |
| 2009/0025238 A1* | 1/2009 | Bowman | E04F 21/26 33/472 |
| 2018/0023934 A1* | 1/2018 | Gjertsen | G01B 3/08 33/809 |
| 2020/0347623 A1* | 11/2020 | Bunn, Jr. | E04F 21/26 |

* cited by examiner

STAIRCASE HANDRAIL SUPPORT DEVICE

CROSS REFERENCE TO RELATED APPLICATION

This application claims the benefit of, and incorporates by reference, U.S. provisional patent application Ser. No. 63/093,034, entitled "Staircase Handrail Support Device," which was filed on Oct. 16, 2020.

BACKGROUND

1. Field

The present general inventive concept relates generally to a support device, and particularly, to a staircase handrail support device.

2. Description of the Related Art

The modern approach to completing staircase designs is to place a complementary handrail beside an incline on a staircase using a holding brace, such that the complementary handrail facilitates movement on the staircase by providing a surface to hold.

During installation, however, it is often challenging for carpenters to place the handrail at an ideal location and/or height for the best support. Also, the installation process requires multiple people to assist and tends to leave unpleasant markings on a wall.

Therefore, there is a need for a staircase handrail support device that can identify proper positioning for the handrail, and useable by one person.

SUMMARY

The present general inventive concept provides a staircase handrail support device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a staircase handrail support device removably connected to a staircase to facilitate installation of a handrail, the staircase handrail support device including a telescopic pole, a base connected to at least a portion of a first end of the telescopic pole to stabilize the telescopic pole on the staircase, a first miter gauge pivotally disposed on at least a portion of the first end of the telescopic pole to indicate a first angle of the telescopic pole with respect to the base, and a second miter gauge pivotally disposed on at least a portion of a second end of the telescopic pole to receive the handrail thereon and indicate a second angle of the telescopic pole with respect to the second miter gauge.

The telescopic pole may include a main section, a telescopic section movably disposed within at least a portion of the main section to move away from the main section in a first direction and move toward the main section in the second direction opposite with respect to the first direction, and a measuring tool disposed on at least a portion of the telescopic section to measure a distance of the second miter gauge away from the main section.

The telescopic pole may further include an adjustment lever disposed on at least a portion of the main section to allow movement of the telescopic section in response to rotating in a first rotational direction and prevent movement of the telescopic section in response to rotating in a second rotational direction opposite with respect to the first rotational direction.

The base may include a first bar, a second bar disposed in parallel to and distanced away from the first bar, a first plate pivotally disposed at a first end of the first bar and the second bar between at least a portion of the first bar and the second bar to connect to a first stair of the staircase and receive a first clamp thereon, and a second plate pivotally disposed at a second end of the first bar and the second bar between at least a portion of the first bar and the second bar to connect to a second stair of the staircase and receive a second clamp thereon.

The staircase handrail support device may further include a bubble level disposed on at least a portion of the telescopic pole to identify a position of the telescopic pole as at least one of horizontal, vertical, and angular based on an orientation of at least one bubble.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
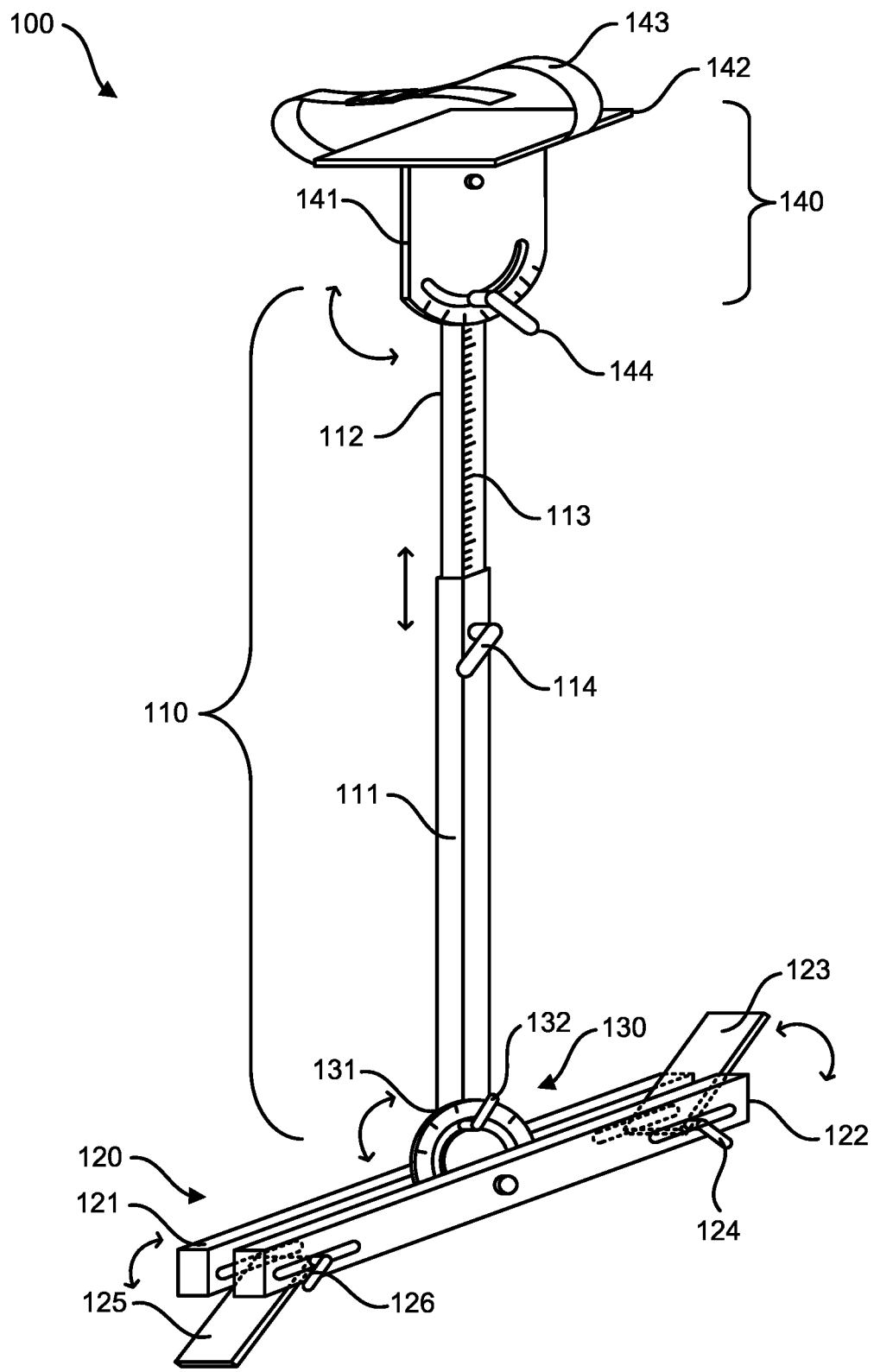
FIG. 1 illustrates a side perspective view of a staircase handrail support device, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Staircase Handrail Support Device 100
Telescopic Pole 110
Main Section 111
Telescopic Section 112
Measuring Tool 113
Adjustment Lever 114
Base 120
First Bar 121
Second Bar 122
First Plate 123
First Plate Lever 124
Second Plate 125
Second Plate Lever 126
First Miter Gauge 130
Body 131
Miter Lever 132
Second Miter Gauge 140
Body 141
Handrail Receiving Surface 142
Handrail Strap 143
Miter Lever 144
Bubble Level 150

FIG. 1 illustrates a side perspective view of a staircase handrail support device 100, according to an exemplary embodiment of the present general inventive concept.

Figure 2:
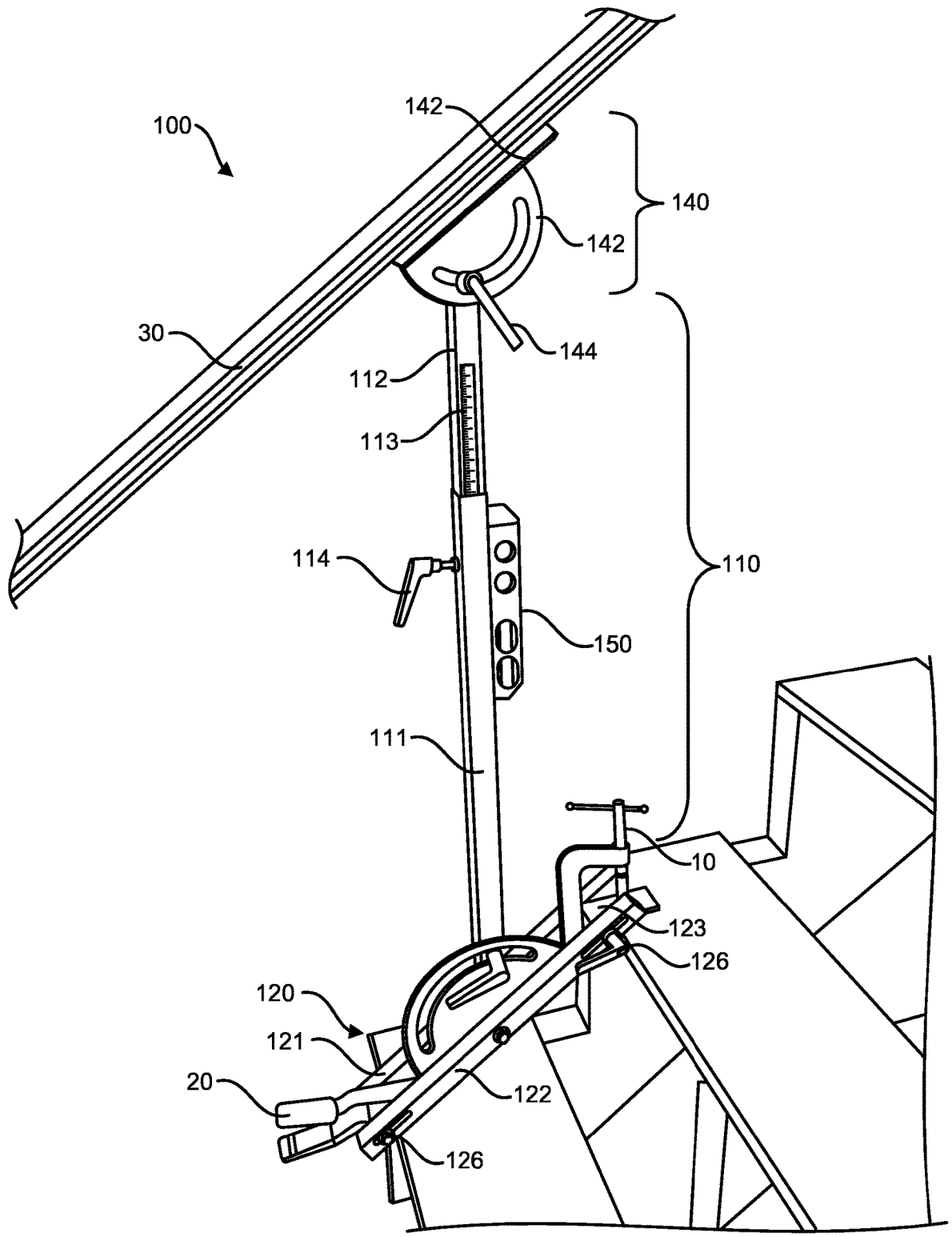
FIG. 2 illustrates a side perspective view of the staircase handrail support device disposed on a staircase, according to an exemplary embodiment of the present general inventive concept.

FIG. 2 illustrates a side perspective view of the staircase handrail support device 100 disposed on a staircase, according to an exemplary embodiment of the present general inventive concept.

The staircase handrail support device 100 may be constructed from at least one of metal, plastic, wood, and rubber, etc., but is not limited thereto.

The staircase handrail support device 100 may include a telescopic pole 110, a base 120, a first miter gauge 130, a second miter gauge 140, and a bubble level 150, but is not limited thereto.

Referring to FIGS. 1 and 2, the telescopic pole 110 is illustrated to have a rectangular prism shape. However, the telescopic pole 110 may be rectangular, circular, conical, triangular, pentagonal, hexagonal, heptagonal, octagonal, or any other shape known to one of ordinary skill in the art, but is not limited thereto.

The telescopic pole 110 may include a main section 111, a telescopic section 112, a measuring tool 113, and an adjustment lever 114, but is not limited thereto.

The main section 111 may have a predetermined size (i.e. length, width, and height) based on a preference of a user and/or a manufacturer.

A first end of the telescopic section 112 may be movably (i.e. slidably) disposed within a first end of the main section 111. In other words, the first end of the main section 111 may receive the telescopic section 112 therein. As such, the telescopic section 112 may move away from the main section 111 in a first vertical direction or a second vertical direction, and toward the main section 111 in the second vertical direction or the first vertical direction.

The measuring tool 113 may include a ruler, a laser measure, and a measuring tape, but is not limited thereto.

The measuring tool 113 may be disposed on at least a portion of a length of the telescopic section 112. As such, the measuring tool 113 may measure a distance away from the main section 111 and/or a distance away from a second end of the main section 111 (i.e. a distance including the main section 111).

The adjustment lever 114 may be disposed on at least a portion of the main section 111. For example, the adjustment lever 114 may be disposed eight inches away from the second end of the main section 111. Moreover, the adjustment lever 114 may allow movement of the telescopic section 113 in response to rotating in a first rotational direction (i.e. clockwise) or a second rotational direction (i.e. counterclockwise), and prevent movement of the telescopic section 113 in response to rotating in the second rotational direction or the first rotational direction.

Accordingly, the adjustment lever 114 may be used to adjust a height of the telescopic section 113.

Also, the adjustment lever 114 may be a one-fourth inch through bolt. However, the adjustment lever 114 may be any type of bolt.

The base 120 may include a first bar 121, a second bar 122, a first plate 123, a first plate lever 124, a second plate 125, and a second plate lever 126, but is not limited thereto.

Referring again to FIGS. 1 and 2, the first bar 121 and the second bar 122 are illustrated to have a rectangular prism shape. However, the first bar 121 and/or the second bar 122 may be rectangular, circular, conical, triangular, pentagonal, hexagonal, heptagonal, octagonal, or any other shape known to one of ordinary skill in the art, but is not limited thereto. As such, the difference in shape may better accommodate a surface upon which the first bar 121 and/or the second bar 122 is placed, such that the base 120 may be stable.

The first bar 121 and/or the second bar 122 may have a predetermined size. For example, the first bar 121 and/or the second bar 122 may have a length of sixteen inches, and have a one inch square shape with respect to a shape of the first bar 121 and/or the second bar 122. Additionally, the first bar 121 and/or the second bar 122 may be parallel with respect to each other.

Referring to FIG. 2, the first bar 121 and/or the second bar 122 may be disposed on a staircase, such as at an angle with respect to a ground surface.

The first plate 123 may be pivotally disposed at a first end of the first bar 121 and/or the second bar 122 therebetween. As such, the first plate 123 may rotate in the first rotational direction or the second rotational direction between the first bar 121 and/or the second bar 122. Furthermore, the first plate 123 may be disposed on a first stair to receive a first clamp 10 thereon, such that the first bar 121 and/or the second bar 122 may be prevented from moving away from the staircase.

Also, the first plate lever 124 may be disposed on at least a portion of the first bar 121 and/or the second bar 122. Moreover, the first plate lever 124 may allow movement of the first plate 123 in response to rotating in the first rotational direction or the second rotational direction, and prevent movement of the first plate 123 in response to rotating in the second rotational direction or the first rotational direction.

Similarly, the second plate 125 may be pivotally disposed at a second end of the first bar 121 and/or the second bar 122 therebetween. As such, the second plate 125 may rotate in the first rotational direction or the second rotational direction between the first bar 121 and/or the second bar 122. Furthermore, the second plate 125 may be disposed on a second stair different from the first stair to receive a second clamp 20 thereon, such that the first bar 121 and/or the second bar 122 may be prevented from moving away from the staircase.

Also, the second plate lever 126 may be disposed on at least a portion of the first bar 121 and/or the second bar 122. Moreover, the second plate lever 126 may allow movement of the second plate 125 in response to rotating in the first rotational direction or the second rotational direction, and prevent movement of the second plate 125 in response to rotating in the second rotational direction or the first rotational direction.

The first miter gauge 130 may include a body 131 and a miter lever 132, but is not limited thereto.

The body 131 may be disposed on the second end of the main section 111, and at a center of the base 120. Additionally, the body 131 may include a plurality of hatch marks thereon to measure an angle of the telescopic pole 110.

Moreover, the miter lever 132 may be movably disposed on at least a portion of the body 131. Furthermore, the telescopic section 110 may be pivotally disposed with respect to the base 120. As such, the miter lever 132 may be used to indicate the angle of the telescopic pole 110 with respect to the base 120.

The miter lever 132 may be disposed on at least a portion of the body 131. Moreover, the miter lever 132 may allow the telescopic pole 110 to pivot with respect to the base 120 in response to rotating in the first rotational direction or the second rotational direction, and prevent movement of the telescopic pole 110 in response to rotating in the second rotational direction or the first rotational direction.

The second miter gauge 140 may include a body 141, a handrail receiving surface 142, a handrail strap 143, and a miter lever 144, but is not limited thereto.

The body 141 may be disposed on a second end of the telescopic section 112.

The handrail receiving surface 142 may be perpendicularly disposed away from the body 141 with respect to a first direction and a second direction opposite with respect to the first direction. The handrail receiving surface 142 may receive a handrail 30 thereon, such that the handrail receiving surface 142 may support the handrail 30 thereon.

The handrail strap 143 may be disposed on at least a portion of the body 141 and/or the handrail receiving surface 142. The handrail strap 143 may wrap and/or connect to another portion of the body 141 and/or the handrail receiving surface 142 to prevent movement of the handrail 30 away from the handrail receiving surface 142. For example, the handrail strap 143 may include a hooks and loops fastener to connect to itself and/or another hooks and loops fastener disposed on the body 141 and/or the handrail receiving surface 142.

Additionally, the body 141 may include a plurality of hatch marks thereon to measure another angle of the telescopic pole 110.

Moreover, the miter lever 144 may be movably disposed on at least a portion of the body 141. Furthermore, the telescopic section 110 may be pivotally disposed with respect to the second miter gauge 140. As such, the miter lever 144 may be used to indicate the angle of the telescopic pole 110 with respect to the second miter gauge 140.

The miter lever 144 may be disposed on at least a portion of the body 141. Moreover, the miter lever 144 may allow the telescopic pole 110 to pivot with respect to the second miter gauge 140 in response to rotating in the first rotational direction or the second rotational direction, and prevent movement of the telescopic pole 110 in response to rotating in the second rotational direction or the first rotational direction.

Accordingly, the second miter gauge 140 may be moved to correspond to the angle indicated on the first miter gauge 130. As such, the handrail 30 may be oriented at the same incline angle as the staircase.

The bubble level 150 may be disposed on at least a portion of the main section 111. The bubble level 150 may include at least one bubble to measure whether a surface is horizontal, vertical, and/or angular based on an orientation of the at least one bubble. As such, the bubble level 150 may facilitate a position of the telescopic pole 110.

Figure 3:
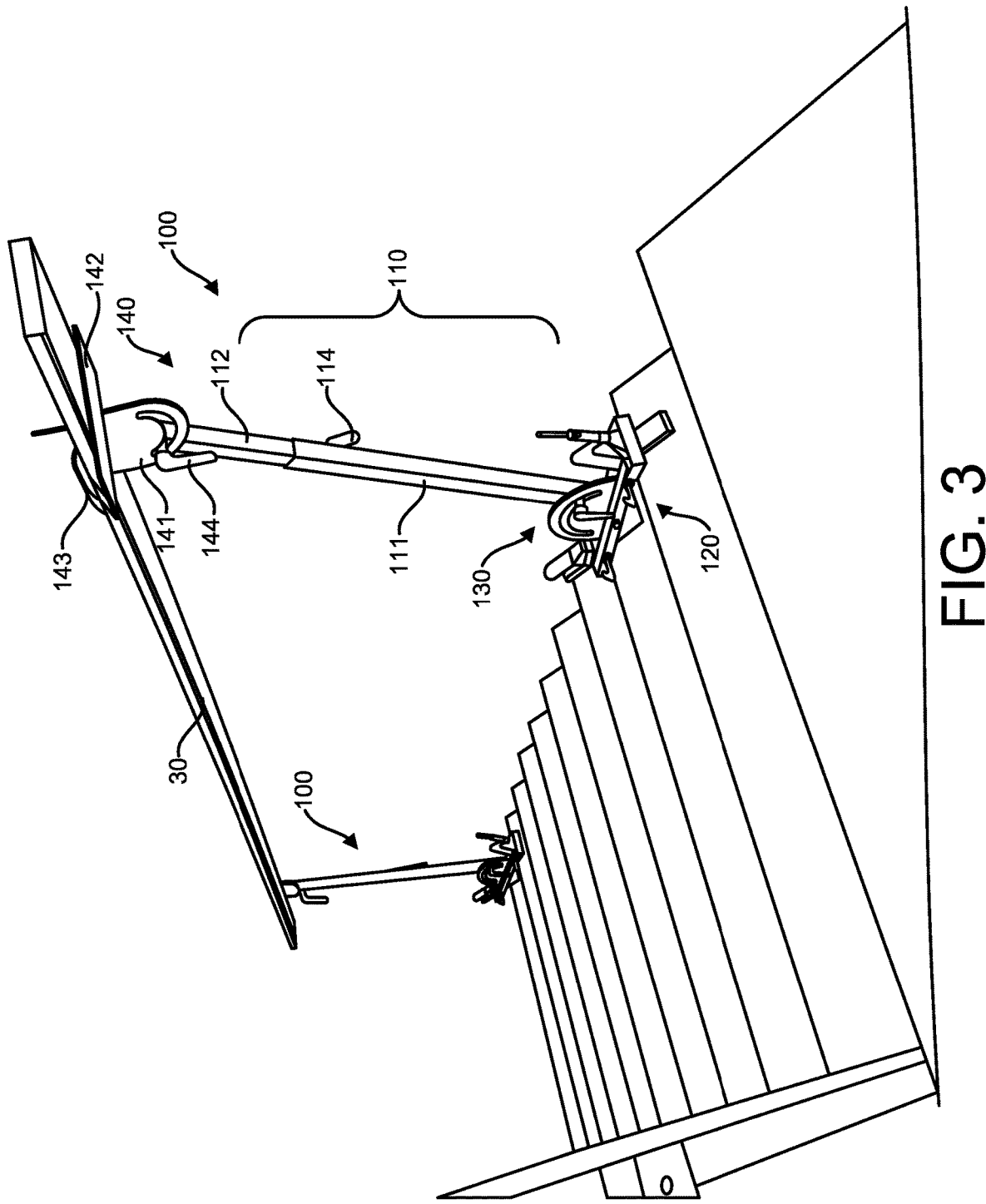
FIG. 3 illustrates a top isometric view of the staircase handrail support device, according to an exemplary embodiment of the present general inventive concept.

FIG. 3 illustrates a top isometric view of the staircase handrail support device 100, according to an exemplary embodiment of the present general inventive concept.

Referring to FIG. 3, the staircase handrail support device 100 may be used with another staircase handrail support device 100 to improve stability of the handrail 30.

Therefore, the staircase handrail support device 100 may position the handrail 30 without requiring assistance from a plurality of people and/or marking a wall.

The present general inventive concept may include a staircase handrail support device 100 removably connected to a staircase to facilitate installation of a handrail 30, the staircase handrail support device 100 including a telescopic pole 110, a base 120 connected to at least a portion of a first end of the telescopic pole 110 to stabilize the telescopic pole 110 on the staircase, a first miter gauge 130 pivotally disposed on at least a portion of the first end of the telescopic pole 110 to indicate a first angle of the telescopic pole 110 with respect to the base 120, and a second miter gauge 140 pivotally disposed on at least a portion of a second end of the telescopic pole 110 to receive the handrail 30 thereon and indicate a second angle of the telescopic pole 110 with respect to the second miter gauge 140.

The telescopic pole 110 may include a main section 111, a telescopic section 112 movably disposed within at least a portion of the main section 111 to move away from the main section 111 in a first direction and move toward the main section 111 in the second direction opposite with respect to the first direction, and a measuring tool 113 disposed on at least a portion of the telescopic section 112 to measure a distance of the second miter gauge 140 away from the main section 111.

The telescopic pole 110 may further include an adjustment lever 114 disposed on at least a portion of the main section 111 to allow movement of the telescopic section 112 in response to rotating in a first rotational direction and prevent movement of the telescopic section 112 in response to rotating in a second rotational direction opposite with respect to the first rotational direction.

The base 120 may include a first bar 121, a second bar 122 disposed in parallel to and distanced away from the first bar 121, a first plate 123 pivotally disposed at a first end of the first bar 121 and the second bar 122 between at least a portion of the first bar 121 and the second bar 122 to connect to a first stair of the staircase and receive a first clamp 10 thereon, and a second plate 125 pivotally disposed at a second end of the first bar 121 and the second bar 122 between at least a portion of the first bar 121 and the second bar 122 to connect to a second stair of the staircase and receive a second clamp 20 thereon.

The staircase handrail support device 100 may further include a bubble level 150 disposed on at least a portion of the telescopic pole 110 to identify a position of the telescopic pole 110 as at least one of horizontal, vertical, and angular based on an orientation of at least one bubble.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A staircase handrail support device removably connected to a staircase to facilitate installation of a handrail, the staircase handrail support device comprising:
    a telescopic pole;
    a base connected to at least a portion of a first end of the telescopic pole to stabilize the telescopic pole on the staircase, the base comprising:
        a first bar,
        a second bar disposed in parallel to and distanced away from the first bar, and
        a first plate pivotally disposed at a first end of the first bar and the second bar between at least a portion of the first bar and the second bar to connect to a first stair of the staircase and receive a first clamp thereon;
    a first miter gauge pivotally disposed on at least a portion of the first end of the telescopic pole to indicate a first angle of the telescopic pole with respect to the base; and
    a second miter gauge pivotally disposed on at least a portion of a second end of the telescopic pole to receive the handrail thereon and indicate a second angle of the telescopic pole with respect to the second miter gauge.

2. The staircase handrail support device of claim 1, wherein the telescopic pole comprises:
    a main section;
    a telescopic section movably disposed within at least a portion of the main section to move away from the main section in a first direction and move toward the main section in a second direction opposite with respect to the first direction; and
    a measuring tool disposed on at least a portion of the telescopic section to measure a distance of the second miter gauge away from the main section.

3. The staircase handrail support device of claim 2, wherein the telescopic pole further comprises:
    an adjustment lever disposed on at least a portion of the main section to allow movement of the telescopic section in response to rotating in a first rotational direction and prevent movement of the telescopic section in response to rotating in a second rotational direction opposite with respect to the first rotational direction.

4. The staircase handrail support device of claim 1, wherein the base further comprises:
    a second plate pivotally disposed at a second end of the first bar and the second bar between at least a portion of the first bar and the second bar to connect to a second stair of the staircase and receive a second clamp thereon.

5. The staircase handrail support device of claim 1, further comprising:
    a bubble level disposed on at least a portion of the telescopic pole to identify a position of the telescopic pole as at least one of horizontal, vertical, and angular based on an orientation of at least one bubble.

* * * * *